United States Patent [19]

Shirts et al.

[11] Patent Number: 4,562,049
[45] Date of Patent: Dec. 31, 1985

[54] RECOVERY OF TITANIUM FROM PEROVSKITE BY ACID SULFATION

[75] Inventors: Monte B. Shirts, South Jordan; Dale A. Martin; Allan E. Petersen, both of Salt Lake City, all of Utah

[73] Assignee: The United States of America as represented by Secretary of Interior, Washington, D.C.

[21] Appl. No.: 652,391

[22] Filed: Sep. 20, 1984

[51] Int. Cl.⁴ .................... C01G 23/00; C01G 23/053
[52] U.S. Cl. ......................................... 423/82; 423/85
[58] Field of Search .................. 423/82, 85, 86, 544; 75/1 T

[56] References Cited

U.S. PATENT DOCUMENTS

| | | | |
|---|---|---|---|
| 2,287,861 | 6/1942 | Bousquet et al. | 423/82 |
| 3,397,037 | 8/1968 | Roberts et al. | 423/82 |
| 4,288,416 | 9/1981 | Davis et al. | 423/82 |

FOREIGN PATENT DOCUMENTS 228396  5/1958  Australia ............................ 423/82

OTHER PUBLICATIONS

Goroshchenko et al., "Chemical Absts.", vol. 54, 1960, p. 12513.
Shtern, "Chemical Absts.", vol. 33, 1939, p. 4386.

*Primary Examiner*—H. T. Carter
*Attorney, Agent, or Firm*—E. Philip Koltos; Thomas Zack

[57] ABSTRACT

Titanium is extracted from perovskite ores or concentrates by reaction of the perovskite ores or concentrates with sulfuric acid to form a sulfated residue, dissolving the sulfated residue in water or dilute acid, removing the precipitated calcium sulfate, and recovering the titanium in an aqueous solution.

12 Claims, 1 Drawing Figure

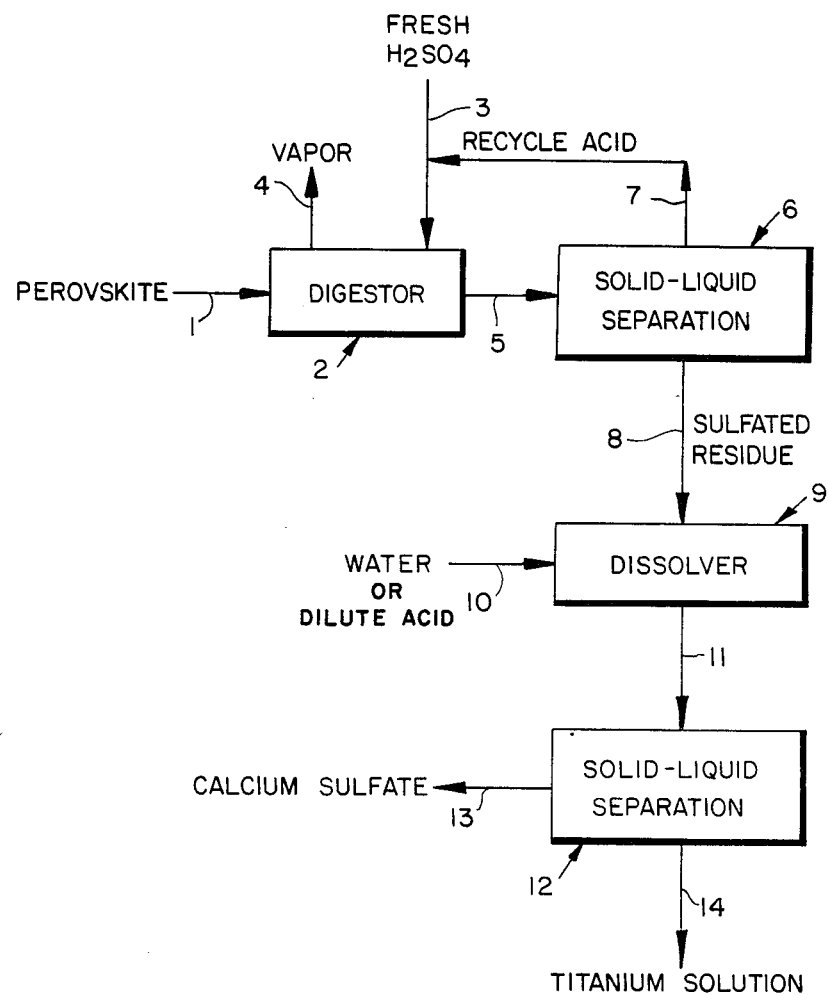

RECOVERY OF TITANIUM FROM PEROVSKITE BY ACID SULFATION

FIELD OF THE INVENTION

This invention relates to the recovery of titanium from calcium-containing ores or concentrates and, more particularly, to methods for the recovery of titanium from calcium-containing ores or concentrates, such as perovskite.

BACKGROUND OF THE INVENTION

Most of the raw feed used for the production of strategic titanium metal pigment is imported. Development of a process to extract titanium and associated values from domestic ore resources would decrease foreign dependency as a source of strategic titanium metal which is used in many industries in the United States.

A review of the literature shows that very little research has been reported on the processing of calcium-containing ores, such as perovskite, in order to recover the titanium. Perovskite ore generally refers to an ore containing calcium and titanium as calcium titanate in sufficient quality and quantity so as to be capable of being a source of calcium and titanium or derivatives thereof. A perovskite concentrate is a perovskite ore that has been subjected to a beneficiation process for removal of waste material, such as gangue and slimes.

There is substantial prior art on the recovery of pigment-grade titanium dioxide from other ores, such as ilmenite or rutile. Thus, U.S. Pat. No. 2,287,861 discloses the production of titanium oxide pigments by digesting ilemenite ore with sulfuric acid to form a solid mass containing titanium sulfate, iron sulfates, and unreacted ore, and gangue. This digest cake is then water treated to form a mass comprising titanium sulfate and ferric sulfates in solution and undissolved solids in suspension. The liquor is then clarified to separate unreacted ore, gangue, and slime residues; and the clarified liquor, which is stock titanium sulfate solution, is subjected to hydrolysis to produce solid crude metatitanic acid. The metatitanic acid may then be calcined at high temperatures to form the final titanium oxide pigment product.

Various improvements can be found in the prior art for conducting this process. Thus, in U.S. Pat. No. 3,397,037, a surface active agent is employed in the leaching step to decrease the time necessary to effect satisfactory leaching. In U.S. Pat. No. 4,321,236, the leaching step is said to be improved by heating the titanium material and mineral acid reactants to an elevated temperature prior to mixing and then mixing in a leaching zone and further heating to a higher temperature. This process is said to cause at least a portion of acid soluble titanium values in the titanium material to be hydrolyzed and removed by precipitation.

Some prior work has been conducted on the recovery of titanium from perovskite ores. Thus in Russian work reported by Shtern, J. Applied Chem., 11, pp. 1155–1160, perovskite containing, in percent: 40.8 $TiO_2$, 30.7 CaO, and 5.2 $Fe_2O_3$, was sulfated by acid baking with twice its weight of 93 pct $H_2SO_4$ at 170°–150° C. for 1 h and then at 150°–125° C. for 1 h, which resulted in 90–93 pct $TiO_2$ sulfation. Applying this method, however, in the treatment of domestic perovskite concentrate resulted in less than 80 pct $TiO_2$ sulfation. The domestic perovskite having a lower $CaO:TiO_2$ ratio is more refractory and not as readily sulfated by acid baking. In work conducted and reported in Russian journals by Goroshchenko et al, Sbornik Trudov Khim., Tekhnol. Mineral. Syrlya, Kolsk. Poluostrova, 1959, No. 1, pp. 25–39, a sulfuric acid-ammonium sulfate fusion of the perovskite ore is employed followed by leaching and precipitation. This process, however, is reagent intensive, the fusion mass is thick and sticky, and the reaction time is several hours.

In a process conducted by the U.S. Bureau of Mines and reported by Elger et al, Report of Investigations 8497, Bureau of Mines, 1980, page 20, perovskite ore is reacted with carbon at high temperatures in an electric furnace to produce titanium carbide which is then chlorinated to titanium tetrachloride. This method is energy intensive, and the carbide form has an extremely high melting point which creates physical handling problems.

In a further method published by Goroshchenko et al, Invest. Karelski Kolsk. Filial, Akad. Narik S.S.S.R., 1959, No. 4, pp. 135–141, a sulfuric acid digestion is employed wherein the digestion reactor contains some ammonium sulfate. This is followed by an extraction step. In this process, the titanium is eventually precipitated as a double salt of ammonia. This process, however, is complicated and reagent intensive since all excess acid is converted to ammonium sulfate by ammonia. Neither of the above-identified Russian studies by Goroshchenko et al indicate conditions wherein sulfuric acid alone could be used to solubilize the titanium.

A further approach known in the art for treating perovskite involves roasting at 1200° C. in hydrogen sulfide gas, followed by leaching to remove calcium and iron sulfides and leaving the titanium dioxide. The disadvantages of this process are high temperatures and use of a highly toxic gas. This work is described, for example, by Kelly et al in Canadian Pat. No. 1,052,581, issued Apr. 17, 1979.

A further procedure known in the art for treatment of perovskite ore is by leaching with nitric acid in an autoclave. This is also an expensive and corrosive process. This work is published by the Russian authors Kestriken et al, Syre, Vses. Nanch-Issled, Inst., Miner. Syrga, No. 13, 1966, pp. 63–69.

It is, therefore, apparent that a need remains in the art for a method which is effective to extract titanium from its combination with calcium in ores, such as perovskite ore, using simplified and efficient processes.

SUMMARY OF THE INVENTION

It is, accordingly, one object of the present invention to provide a method for the recovery of titanium from calcium-bearing ores exhibiting a variety of calcium to titanium molar ratios, including the more refractory ores which contain little or no calcium.

A further object of the invention is to provide a method for the recovery of titanium from perovskite ores or concentrates using sulfuric acid digestion which is not energy intensive and uses inexpensive reagents.

Other objects and advantages of the present invention will become apparent as the description thereof proceeds.

In satisfaction of the foregoing objects and advantages, there is provided by this invention a method for the recovery of titanium as an aqueous solution from ores or concentrates which contain titanium and calcium, such as perovskite ore, which comprises digesting the ore or concentrate with sulfuric acid to form a sulfated residue, removing the remaining liquor from the residue, leaching the residue in water to produce an aqueous solution of the titanium and a separable calcium sulfate residue.

BRIEF DESCRIPTION OF THE DRAWINGS

Reference is now made to the drawing accompanying the application, wherein the sole FIGURE is a flow sheet for practicing the process of the invention.

DESCRIPTION OF THE PREFERRED EMBODIMENTS

The present invention is concerned with the recovery of titanium from ore or concentrate starting materials which contain titanium and calcium, usually in combination as calcium titanate. The calcium and titanium may be present in the starting material over a wide variety of ratios. This process makes use of an initial sulfuric acid digestion step, separation of the residue resulting from the digestion step, and leaching the residue with water, by which the calcium will be removed as a sulfate precipitate, and the titanium may be recovered contained in an aqueous solution.

The starting material is any ore which contains calcium and titanium. It is preferred that the starting material be a concentrate of perovskite ore since the concentrate will have slimes and gangues removed therefrom. The perovskite is a naturally occurring mineral of calcium titanate and is often associated with significant amounts of calcium, magnesium, strontium, and barium compounds in addition to the titanium, as well as the slimes which are usually found in most ores. It is preferable that the perovskite ore be initially beneficiated by known methods to provide the perovskite concentrate as the preferred starting material. It is also preferred that the concentrate be ground to a powder size which will be easily digested with sulfuric acid in the initial step in a digester. It is highly preferred that the perovskite be ground to at least −35 mesh or finer material prior to treatment with the sulfuric acid.

In the initial step, the perovskite ore is treated with sufficient sulfuric acid in a digester under conditions that the titanium component will dissolve in the acid but quickly reprecipitate as a sulfate. This digestion will, therefore, provide a sulfated residue which contains titanium sulfate and calcium sulfate and other insoluble components. Since an excess of acid is used to effect digestion, the sulfated residue will be a precipitated solid contained in the excess acid mother liquor. The maximum theoretical amount of sulfuric acid needed for sulfation would require one molecule of acid for each atom of titanium and calcium. Preferably, however, more than three times this stoichiometric amount of acid should be available in the digester. This is especially important when digesting the more refractory ores which contain less than one atom of calcium per atom of combined titanium.

In the digester, a wide variety of conditions can be used to obtain satisfactory results. Thus, the digester temperature can range from 150° C. up to 338° C., depending on the concentration of the acid. The boiling point of 98 wt. % concentrated sulfuric acid is about 338° C., but if acid concentrations are varied from 98 to 70 wt. %, temperatures may be as low as 165° C. Tests conducted at 300° C. or more in 96 wt. % concentrated acid show that the reaction takes less than 10 minutes to go to completion. However, a reaction time of up to 3 hours is needed when the digestion is conducted using 70 wt. % acid at 165° C. Time to complete the reaction is also appreciably affected by the grinding size. Therefore, it may be stated that the digestion step in the presence of sulfuric acid requires a reaction time of about 10 minutes to 3 hours at temperatures ranging from 165° C. up to 338° C. and acid concentrations ranging from 70 to 98 wt. %.

On completion of the digestion step, there is formed the sulfated residue wherein sulfates of titanium and calcium, as well as other reactants, are contained therein in excess acid mother liquor. As indicated above, it is essential that an excess of acid liquor be used during digestion. Using excess acid dramatically improves titanium sulfation especially when digesting perovskite containing less than one atom of calcium per atom of combined titanium. The resulting slurry can also be handled more easily than can the solid mass produced in certain baking and fusion processes.

On completion of the digestion step, the sulfated residue is separated from the acid, and the reclaimed acid may be recycled back to the digester. The sulfated residue is preferably separated from the acid by filtration while hot by conventional means.

The resulting residue is then leached with water or dilute acid to dissolve the titanium. Leaching temperatures ranging from ambient to 150° C. can be used. Temperatures above 50° C. are generally preferred because the leaching time is significantly decreased. Sufficient water may be used to produce pregnant liquors containing up to 200 g/L of titanium. The preferable liquor should contain at least 50 g/L titanium.

During water leaching, the calcium sulfate does not dissolve since it is essentially water-insoluble. The calcium sulfate is then removed by a separation step as by filtration to provide an aqueous solution containing the titanium sulfate which is soluble in water. The titanium is then recovered from the water-leached solution preferably by hydrothermal precipitation so that the titanium is recovered as titanium dioxide.

Reference is now made to the drawing accompanying the invention which illustrates the process conducted in a continuous manner. Thus, the perovskite ore from line 1 is introduced into digester 2 for reaction with sulfuric acid from line 3, which may also contain recycle acid. In the digester, which is operated at the temperatures indicated, vapors are generated which are removed by line 4. The resulting digested ore, which contains the sulfated residue, is then passed by line 5 to a solid-liquid separator 6, such as a filter, where the liquid or mother liquor, which comprises the excess sulfuric acid, is removed and recycled by line 7 for reuse in the digester.

The sulfated residue is then removed by line 8 to a dissolution tank 9, where it is dissolved in water or dilute acid from line 10 to effect leaching of the residue. The aqueous suspension from the dissolver 9 is then passed by line 11 to a solid-liquid separation step, as in a filter 12, from which calcium sulfate as a solid is removed at 13. An aqueous solution of the titanium is recovered at 14, from which the titanium can be recovered as the titanium dioxide pigment.

The water or dilute acid serves to extract and separate the titanium from the calcium sulfate. This extraction takes place because of differences in solubility of the calcium sulfate and titanium sulfate. Further, after the calcium sulfate is removed from the dissolver slurry, the resulting titanium-rich solution can then be treated by known methods to recover the pigment as titanium dioxide.

It will be understood that the method of the invention uses a number of steps not known in the art which provide advantages in the extraction of titanium from perovskite ores. Thus, less toxic corrosive chemicals are used than known to the art. Further, the process is less reagent-intensive, less energy-intensive, and requires less steps and fewer types of reagents than the known prior art. Accordingly, the use of inexpensive chemical reagents, such as sulfuric acid, to extract the titanium from perovskite ore at moderate temperatures and reaction times, provides a useful advance in the art in the production of titanium from perovskite ores.

The following examples are presented to illustrate the invention, but it is not to be considered as limited thereto. The examples are throughout the specification, parts are by weight unless otherwise indicated.

EXAMPLE 1

One hundred grams of perovskite concentrate which have been ground to a −100 mesh size and which contain, in percent, 47.0 $TiO_2$, 26.2 CaO, and 3.2 $Fe_2O_3$ were treated with 500 grams of 96 wt. % sulfuric acid at 300° C. for 10 minutes. The resulting sulfated residue, which weighed 275 grams, was then filtered from the hot acid. The resulting residue was then leached with 500 ml of water to dissolve out of the residue 97 percent of the titanium. The calcium sulfate which precipitated was filtered out, and the rich titanium solution assayed 56 grams of titanium per liter. The titanium was then recovered from the water-leached solution as hydrous titanium dioxide by hydrothermal precipitation.

EXAMPLE 2

A total of 100 grams of −65 mesh perovskite concentrate was treated at 300° C. in 96 wt. % sulfuric acid for 10 minutes. Using the procedures of Example 1, it was determined that titanium sulfation was 97 percent. In similar tests using −35 mesh concentrate, 94 percent of the titanium was sulfated. This compares to a 97 percent sulfation using −100 mesh perovskite concentrate as obtained in Example 1. Thus, this example demonstrates that sufficient sulfation is obtained so long as the ore is sufficiently fine ground, sufficient sulfuric acid is used, and proper temperatures are employed in carrying out the sulfation process.

EXAMPLE 3

A total of 100 grams of −100 mesh perovskite concentrate was treated at 200° C. in 80 wt. % sulfuric acid for 2 hours. Using the same procedures as outlined in Example 1, it was found that 96 percent of the titanium had been sulfated. In similar tests using −65 mesh and −35 mesh perovskite concentrate as the starting material, the titanium sulfation was 95 and 92 percent, respectively.

EXAMPLE 4

A total of 100 grams of −100 mesh perovskite concentrate was treated with 85 wt. % percent sulfuric acid at 223° C. for 20 minutes. The sulfated residue was then filtered to separate it from the acid and dissolved in water and leached as in Example 1. Quality and recovery of titanium was similar to Example 1.

EXAMPLE 5

A total of 100 grams of −100 mesh perovskite was treated with 70 wt. % percent sulfuric acid at 165° C. for 180 minutes. It was then processed as in Example 1 by removal of the residue from the sulfuric acid and dissolving in water. Comparable results were obtained.

The invention has been described herein with reference to certain preferred embodiments. However, as obvious variations thereon will become apparent to those skilled in the art, the invention is not to be considered as limited thereto.

What is claimed is:

1. A method for the recovery of titanium from calcium-titanium containing minerals found in ores or concentrates which comprises the steps of:
   (a) digesting the ore or concentrate with boiling sulfuric acid to form a sulfated residue in unreacted sulfuric acid thus forming a slurry:
   (b) removing the sulfuric acid from the sulfated residue slurry;
   (c) leaching the sulfated residue in water using sufficient water to dissolve the contained titanium values from the insoluble calcium sulfate;
   (d) removing the solid insoluble calcium sulfate by filtration;
   (e) recovering an aqueous solution of the titanium; and
   (f) precipitating the titanium from the aqueous solution.

2. A method according to claim 1, wherein calcium-titanium minerals found in ore or concentrate contains calcium-titanium in a variety of molar ratios including refractory ores and concentrates which contain minor amounts of calcium.

3. A method according to claim 1, wherein the ore or concentrate contains calcium titanate.

4. A method according to claim 1, wherein the ore or concentrate is perovskite.

5. A method according to claim 1, wherein the ore or concentrate is treated with an excess of boiling sulfuric acid to remove excess water and maintain reaction temperature for sufficient time to effectively sulfate the calcium and titanium values contained in the ore, the sulfated residue plus unreacted acid forming a slurry.

6. A method according to claim 5, wherein the sulfuric acid mother liquors are separated from the sulfated residues and recycled to the digestion step.

7. A method according to claim 6, wherein the sulfated residue is dissolved in sufficient water or dilute acid to dissolve the titanium values from the insoluble calcium sulfate.

8. A method according to claim 7, wherein the aqueous solution containing the titanium values is then treated to recover the titanium as titanium dioxide.

9. A method according to claim 8, wherein the titanium is recovered by evaporation and hydrothermal precipitation.

10. A method for the production and recovery of titanium from perovskite ores which comprises the steps of:
   (a) digesting a perovskite ore or concentrate by contacting with more than three times the stoichiometric requirements of boiling sulfuric acid at temperatures ranging from 150° C. to 338° C. for a sufficient time to sulfate at least the calcium and titanium values contained in 35 mesh or less ore or concentrate;
   (b) separating the sulfated solids from the sulfuric acid liquids in the resulting mixture to provide a solid sulfate residue;
   (c) removing the sulfated residue to a dissolver, leaching with sufficient water or dilute acid, at ambient temperature to 150° C., to dissolve titanium values contained in the residue;

(d) separating the solids and liquids to remove the insoluble calcium sulfate solids and provide a solution containing the titanium values.

11. A method according to claim 10, wherein the aqueous solution containing the titanium values is subjected to evaporation and hydrothermal precipitation to recover the titanium as titanium dioxide.

12. A method according to claim 10, wherein sulfuric acid liquids from step (b) are recycled to step (a) to digest additional ore or concentrate.

* * * * *